United States Patent [19]
Kapusnik et al.

[11] Patent Number: 5,452,839
[45] Date of Patent: Sep. 26, 1995

[54] STUD GUN POSITIONING APPARATUS

[75] Inventors: John J. Kapusnik, Escondido; John A. Campbell, Bonita; Richard B. Griffin, Chula Vista, all of Calif.

[73] Assignee: Solar Turbines Incorporated, San Diego, Calif.

[21] Appl. No.: 262,173

[22] Filed: Jun. 20, 1994

[51] Int. Cl.⁶ .................................................. B23K 9/20
[52] U.S. Cl. ........................... 228/45; 228/44.3; 219/98; 219/227
[58] Field of Search .................... 228/6.1, 44.3, 228/45, 212, 59; 219/98, 99, 227, 242

[56] References Cited

U.S. PATENT DOCUMENTS

| | | | |
|---|---|---|---|
| 5,130,510 | 7/1992 | Zeigler et al. | 219/98 |
| 5,138,128 | 8/1992 | Van Rhyn et al. | 219/98 |
| 5,353,567 | 10/1994 | Knight et al. | 52/506.03 |

*Primary Examiner*—Samuel M. Heinrich
*Attorney, Agent, or Firm*—Frank L. Hart

[57] ABSTRACT

An electric stud gun positioning apparatus is attachable to a collar of a stud gun and has making parts for aligning and orienting the stud relative to a part on which the stud is to be welded.

14 Claims, 3 Drawing Sheets

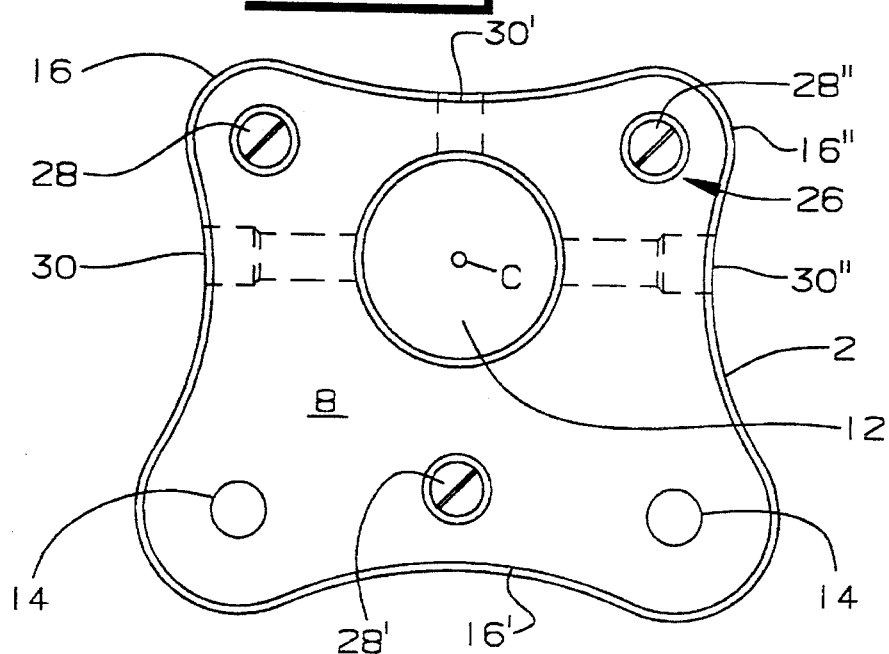
Fig_2_
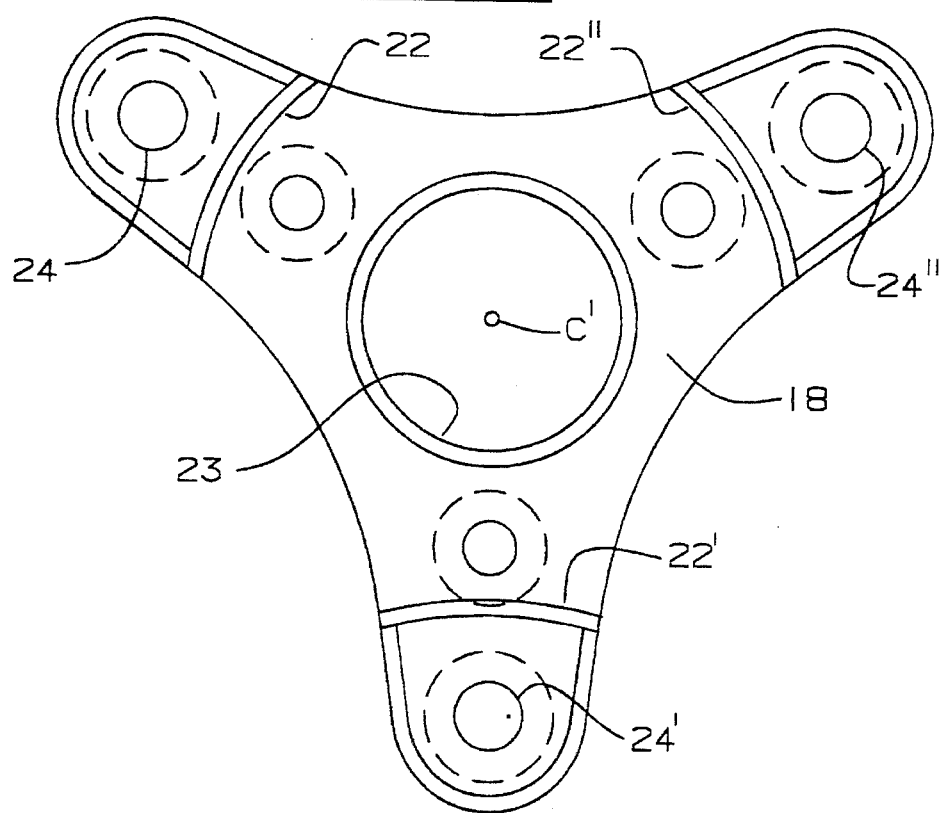
Fig_3_

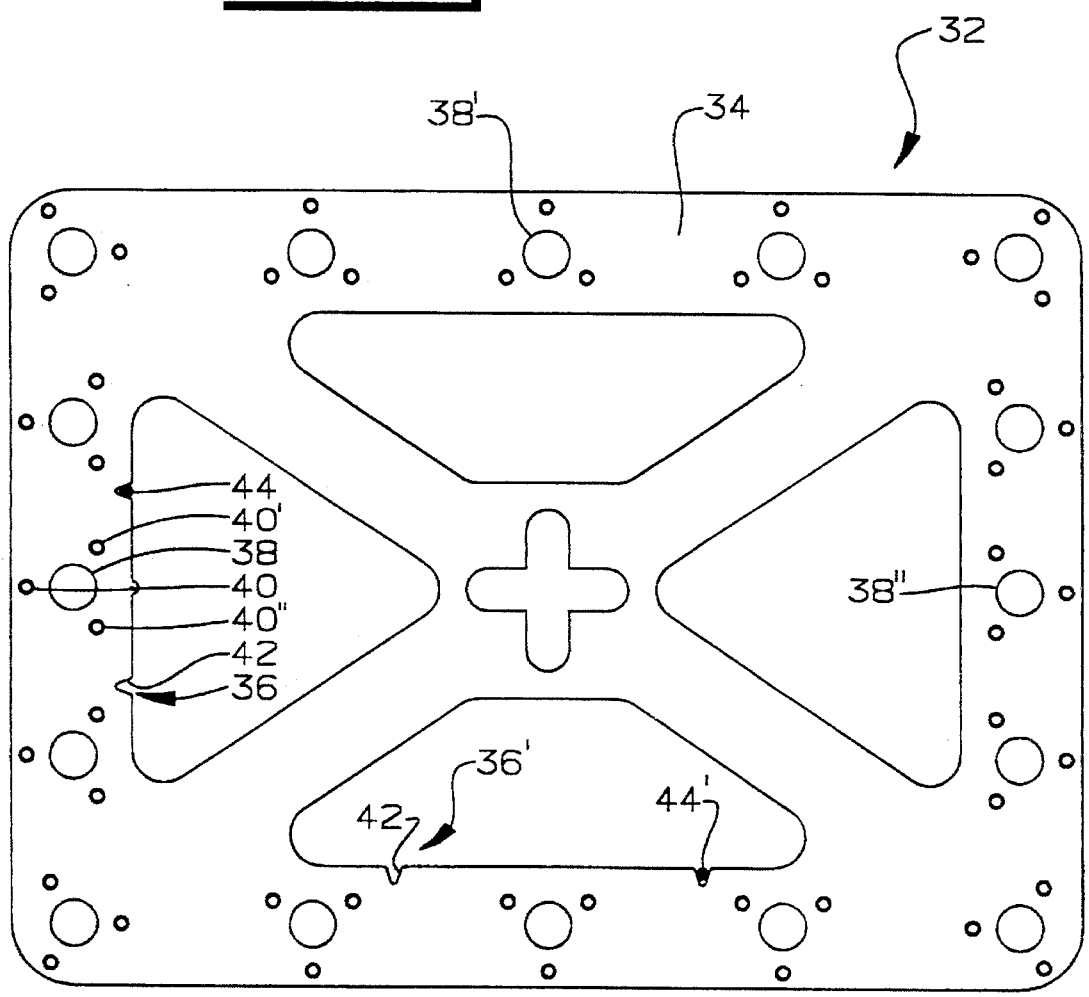
Fig_4

STUD GUN POSITIONING APPARATUS

TECHNICAL FIELD

The present invention relates to apparatus for accurately positioning a stud gun during welding of a stud to a part receiving the stud.

BACKGROUND ART

As is known in the art, electrically powered stud guns are utilized to weld a stud to a part, such as a metal frame about a hatch opening. Heretofore, it has been most difficult to correctly position the studs in the plane of the part. Furthermore, it has also been difficult to maintain the hand held stud gun at an orientation normal to the plane of the part.

These difficulties of operation result in misplaced studs, studs angularly oriented relative to normal. Repositioning of the studs are required in many cases and in other situations where the studs extend at angles other than normal, they must either be removed and replaced or forced to the correct angle by impacting the stud. This is particularly true where the stud receiving parts have a tolerance less than plus or minus 0.06 inches. Manual layout of stud positions is also a major construction problem.

Such problems as set forth above represent the waste of time, labor, equipment, and natural resources.

The present invention is directed to overcome one or more of the problems as set forth above.

DISCLOSURE OF THE INVENTION

A stud gun positioning apparatus is provided for a stud gun which has guide bars and a stud collar. A first means is provided for releasable attachment to the stud gun collar. A second means is provided for connection to the first means, extending about the collar, being maintained at a preselected orientation relative the first means and providing retaining elements for orientating and maintaining the stud gun relative to a part receiving the stud.

BRIEF DESCRIPTION OF THE DRAWINGS

FIG. 2 is a diagrammatic frontal view of the base plate of the apparatus;

FIG. 3 is a diagrammatic frontal view of the positioning plate of the apparatus; and FIG. 4 is a diagrammatic frontal view of a template that is adapted to be used with the apparatus of this invention.

BEST MODE FOR CARRYING OUT THE INVENTION

Figure 1:
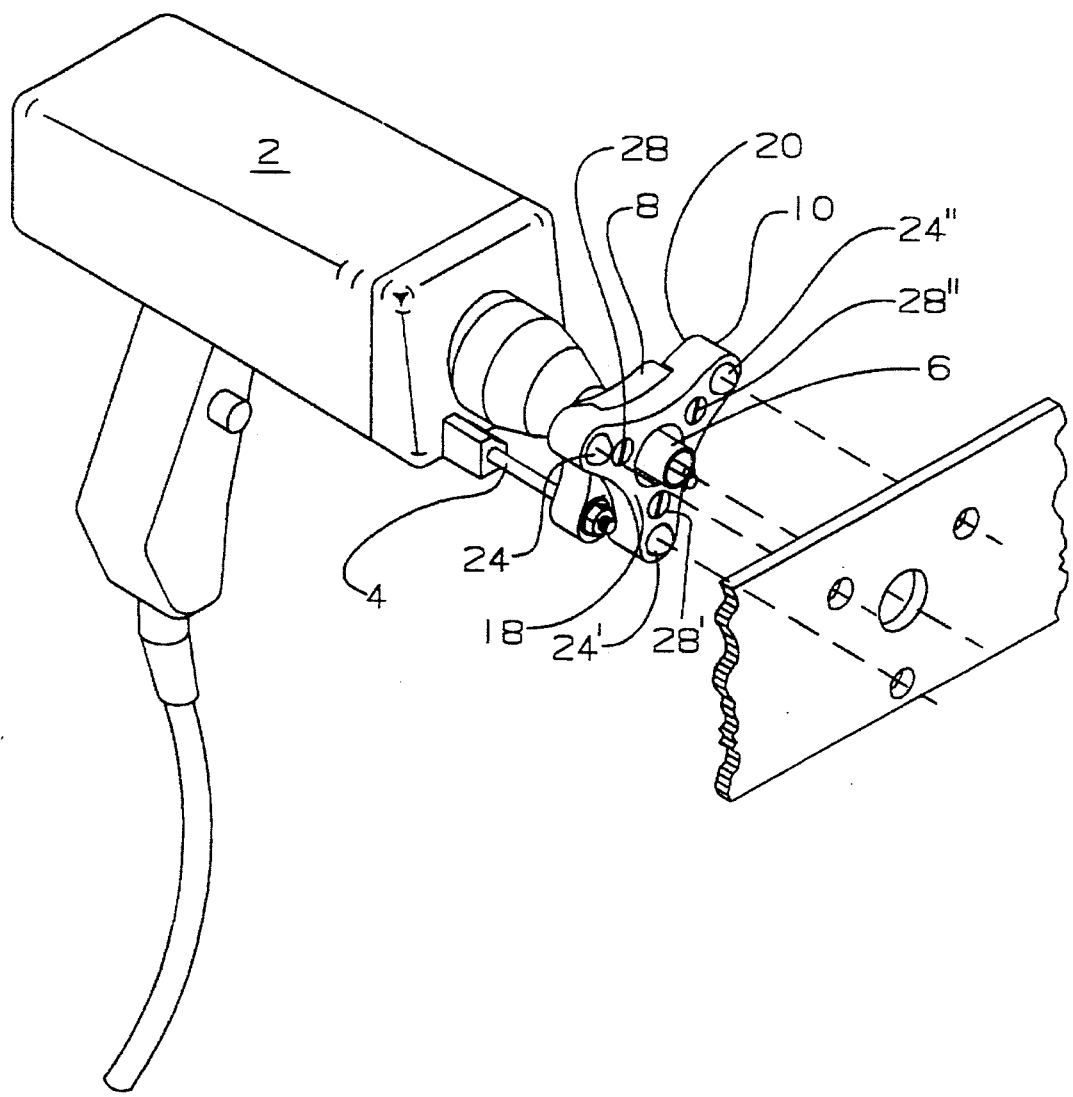
FIG. 1 is a perspective view of the apparatus of this invention mounted on a stud gun and being positioned adjacent a part for receiving a stud.

Referring to FIG. 1, an electrically powered stud gun 2, as is well known in the art, has guide bars 4 (only one shown) and a stud collar 6. A base plate 8 is releasably attachable to the stud collar 6 and a positioning plate 10 is releasably attachable to the base plate 8.

Referring to FIGS. 1 and 2, the base plate 8 has a collar opening 12, guide bar openings 14 and spaced apart positioning elements 16,16',16". The base plate is positionable about the stud collar 6 with the guide bars 4 extending through the guide bar openings 14.

The positioning plate 10 has first and second faces 18,20, a collar opening 12, spaced apart positioning elements 22,22',22" of a configuration matable with the positioning elements 16,16',16" of the base plate 8 and a plurality of retaining elements 24,24',24" extending outwardly from the positioning plate first face 18. The positioning plate 10 is positionable about their stud collar 2 with the positioning elements 22,22',22" matable with the positioning elements 16,16',16" of the base plate 8. The positioning plate 10 is releasable attachable to the base plate 8 with the second face 20 of the positioning plate 10 immediately adjacent the base plate 8.

The positioning elements 22,22',22" and 16,16',16" are respectfully matable with ne another and of non-linear configuration. A non-linear flange defines one of the elements, for example 22 or 16, and the other respective element, for example 22 or 16, is matable with the flange to monitor correct execution. Such matable pairs 22,16/22'16'/22",16" are of this construction.

Means 26, such as for example, bolts or screws 28,28', 28", are provided for connecting the positioning plate 10 to the base plate 8. Other means of attachment, for example welding, can be utilized without departing from this invention. The base plate 8 and positioning plate 10 can also be of unitary construction. However, a unitary construction will not permit the changing of only the positioning plate 10 for different stud locating set ups. Likewise, the base plate 8 can be connected to the stud collar 8 with screws 30,30',30", as shown in FIG. 2. The retaining elements 24,24',24" each have an end of curvilinear configuration, as best seen in FIG. 1. More preferably, the retaining elements 24,24',24" each have an end of substantially hemispherical configuration.

Referring to FIGS. 1 and 2, there are at least two spaced apart retaining elements 24,24' each positioned a preselected distance from the center "C" of the base plate collar opening 12. Preferably, there are three spaced apart retaining elements 24,24',24" each positioned a substantially equal distance from the center "C" of the base plate collar opening 12. Also, it is preferable that these retaining elements 24,24',24" are spaced substantially an equal distance one from others.

Referring to FIGS. 1 and 3, there are at least two spaced apart positioning elements 22,22" each positioned a preselected distance from the center "C'" of the positioning plate collar opening 23. Preferably, there are three spaced apart positioning elements 22,22',22" each positioned a substantially equal distance from the center "C" of the positioning plate collar opening 23. Also, it is preferable that these positioning elements 22,22',22" are spaced substantially an equal distance one from others.

The positioning elements 22,22',22" can be positioned in depressions on a first face of a construction for orienting and maintaining the stud gun 2 during operation thereof. More preferably, referring to FIG. 4, a template 32 is provided which is constructed for the collar opening pattern and alignment of stud location on the part. The template has a first face 34 and first and second spaced apart stops 36,36'. A plurality of collar openings 38,38',38" are positioned at preselected locations one from the other with each collar opening having adjacent thereto a plurality of depressions 40,40',40" on the first face 34 for receiving, and mating with the retaining elements 24,24',24" of the positioning plate 10. As is known in the art, the template 32 is constructed to meet the desired stud pattern on the part and, for example, about an opening or hatchway in the part.

The first and second stops 36,36' of the template 32 are matable at preselected locations on selected locations on the part to which a stud from the stud gun 2 is to be attached. The stops 36,36' can be, for example notches 42, 42' in one of the template 32 and part to which a stud is to be attached with said notches being of a construction sufficient to be matable with protrusions 44,44' extending from the other of said template 32 and part to which a stud is to be attached. In another embodiment also shown in FIG. 4, the stops 36,36' can be protrusions extending from the template 32 and being contractible with edges of the part to which a stud is to be attached.

Industrial Applicability

With the positioning apparatus attached to the stud gun 2, the positioning elements 22,22',22" can be mated into respective depressions 40,40',40" of the template 32 and a stud accurately welded normal to a part. The template or depressions in the part itself orient the studs in the XY plane of the part and the positioning plate 10 along with the positioning elements in their respective depressions assure a normal angle of the stud relative to the part. The template 32 can be used to speed of operations where there are a plurality of associated studs to be welded.

Other aspects, objects and advantages of this invention can be obtained from a study of the drawings, the disclosure and the appended claims.

What is claimed is:

1. A stud gun positioning apparatus for a stud gun having guide bars and a stud collar, comprising:

a base plate having a collar opening, guide bar openings, and spaced apart positioning elements, said base plate being positionable about the stud collar with the guide bars extending through the guide bar openings and said base plate being releasably connectable to said stud collar;

a positioning plate having first and second faces, a collar opening, spaced apart positioning elements of a configuration matable with the positioning elements of said base plate and having a plurality of retaining elements extending outwardly from the positioning plate first face, said positioning plate being positionable about the stud collar with the positioning elements matable with the positioning elements of the base plate and said positioning plate being releasable attachable to the base plate with the second face of the positioning plate immediately adjacent the base plate; and means for releasable connecting the positioning plate to the base plate.

2. A positioning apparatus, as set forth in claim 1, wherein the retaining elements each have an end of curvilinear configuration.

3. A positioning apparatus, as set forth in claim 1, wherein there are at least two spaced apart retaining elements each positioned a preselected distance from the center of the positioning plate collar opening.

4. A positioning apparatus, as set forth in claim 3, wherein there are three spaced apart retaining elements each positioned a substantially equal distance from the center of the positioning plate collar opening.

5. A positioning apparatus, as set forth in claim 4, wherein the retaining elements are each respectfully positioned a substantially equal distance from one another.

6. A positioning apparatus, as set forth in claim 1, wherein the positioning elements of the base plate and positioning plate are each respectfully space one from the other.

7. A positioning apparatus, as set forth in claim 6, wherein there are at least two positioning elements on each of the base plate and positioning plate.

8. A positioning apparatus, as set forth in claim 6, wherein there are three positioning elements on each of the base plate and positioning plate.

9. A positioning apparatus, as set forth in claim 8, wherein the positioning elements on each of the base plate and positioning plate are each respectfully located a preselected distance from the center of their respective collar opening.

10. A positioning apparatus, as set forth in claim 9, wherein the positioning elements on each of the base plate and positioning plate are respectfully located a substantially equal distance from one another.

11. A positioning apparatus, as set forth in claim 1, wherein the retaining elements have an end of generally hemispherical configuration and including a template having a first face, first and second spaced apart stops, a plurality of stud openings positioned at preselected locations one from the other with each stud opening having adjacent thereto a plurality of depressions on the first face each of a construction and location sufficient for receiving and mating with the retaining elements of the positioning plate.

12. A positioning apparatus, as set forth in claim 11, wherein the first and second stops of the template are matable at preselected locations on the part to which a stud from the stud gun is to be attached.

13. A positioning apparatus, as set forth in claim 12, wherein the first and second stops are notches in one of the template and part to which a stud is to be attached with said notches being of a construction sufficient to be matable with protrusions extending from the other of said template and part to which a stud is to be attached.

14. A positioning apparatus, as set forth in claim 12, wherein the first and second stops are protrusions extending from the template and being contactable with edges of the part to which a stud is to be attached.

* * * * *